United States Patent
Li et al.

(10) Patent No.: US 10,330,868 B2
(45) Date of Patent: Jun. 25, 2019

(54) PLUGGABLE FIBER LOOPBACK APPARATUS AND METHODS FOR FIBER OPTICAL SYSTEMS

(71) Applicant: ALLIANCE FIBER OPTIC PRODUCTS, INC., Sunnyvale, CA (US)

(72) Inventors: Yao Li, Neward, CA (US); Chen Xia, Leping (CN); Shiping Zhang, Xinqichaoshi (CN)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/610,049

(22) Filed: May 31, 2017

(65) Prior Publication Data
US 2018/0348446 A1    Dec. 6, 2018

(51) Int. Cl.
G02B 6/30 (2006.01)
G02B 6/38 (2006.01)
G02B 6/26 (2006.01)
G02B 6/293 (2006.01)

(52) U.S. Cl.
CPC .......... *G02B 6/3827* (2013.01); *G02B 6/266* (2013.01); *G02B 6/2937* (2013.01); *G02B 6/29361* (2013.01); *G02B 6/385* (2013.01); *G02B 6/3823* (2013.01); *G02B 6/3873* (2013.01); *G02B 6/3897* (2013.01)

(58) Field of Classification Search
CPC .... G02B 6/3827; G02B 6/3897; G02B 6/385; G02B 6/29361; G02B 6/3873; G02B 6/3823
See application file for complete search history.

(56) References Cited

U.S. PATENT DOCUMENTS

| | | | |
|---|---|---|---|
| 5,790,314 A * | 8/1998 | Duck | G02B 6/29389 359/652 |
| 6,122,420 A | 9/2000 | Satoh | |
| 6,404,954 B1 * | 6/2002 | Zhu | G02B 6/2937 385/33 |
| 6,583,867 B1 | 6/2003 | Jennings et al. | |
| 7,231,116 B2 * | 6/2007 | Tanaka | G02B 6/29389 385/24 |

(Continued)

OTHER PUBLICATIONS

International Search Report and Written Opinion PCT/US2018/034654 dated Oct. 1, 2018, 12 Pgs.

*Primary Examiner* — Ellen E Kim
(74) *Attorney, Agent, or Firm* — Adam R. Weeks

(57) ABSTRACT

The loopback apparatus disclosed herein is used with an optical fiber system having an optical fiber cable. The loopback apparatus includes an optical fiber having input and output ends and an output optical fiber having input and output ends. The loopback apparatus also includes an optical system that defines an optical path and that is configured to optically couple the output end of the input optical fiber with the input end of the output optical fiber over the optical path. The loopback apparatus also includes a thin-film filter disposed in the optical path and configured to provide a select amount of attenuation for light traveling over the optical path. The loopback apparatus can be plugged into and unplugged from the optical fiber cable. Loopback methods for measuring the performance of the optical fiber system using the loopback apparatus are also disclosed.

23 Claims, 18 Drawing Sheets

(56) References Cited

U.S. PATENT DOCUMENTS

| | | |
|---|---|---|
| 8,538,209 B1 | 9/2013 | Li |
| 9,551,831 B1 * | 1/2017 | Peng ...................... G02B 6/264 |
| 2002/0118920 A1 * | 8/2002 | Francis .............. G02B 6/29362 |
| | | 385/33 |
| 2003/0108297 A1 | 6/2003 | Lee |
| 2003/0185513 A1 * | 10/2003 | Hellman .............. G02B 6/2937 |
| | | 385/47 |
| 2004/0091229 A1 * | 5/2004 | Li .......................... G02B 6/266 |
| | | 385/140 |
| 2008/0131128 A1 * | 6/2008 | Ota .................... H04J 14/0201 |
| | | 398/79 |
| 2009/0110347 A1 * | 4/2009 | Jacobsson ................ G02B 6/32 |
| | | 385/16 |

* cited by examiner

PLUGGABLE FIBER LOOPBACK APPARATUS AND METHODS FOR FIBER OPTICAL SYSTEMS

FIELD

The present disclosure relates to fiber optical systems, and in particular to a pluggable fiber loopback apparatus and methods for fiber optical systems.

BACKGROUND

Fiber optical systems are used in optical telecommunications to send optical signals from one location to another. Fiber optical systems typically employ an optical fiber cable that defines an optical link that optically connects one piece of optical equipment at one location (i.e., on one side of the optical link) to another piece of optical equipment at another location (i.e., on the other side of the optical link). For example, the optical link may be between a server in a data center and a computer at a control center. In many cases, the optical fiber cable supports multiple optical fibers over which the optical signals are transmitted and received in both directions using transmitters and receivers (e.g., transceivers) at both ends of the optical link.

Fiber-based loopback apparatus are often used to test the performance of fiber optical systems by providing an optical communication path over at least a portion of the optical link between a transmitter and a receiver at the same piece of optical equipment, i.e., on the same side of the optical link. This allows for the performance of the fiber optical system to be evaluated and managed from one end of the system. The loopback apparatus simulates the actual losses in the optical transmission than can occur in a fiber optical system by providing a select amount of attenuation to the optical signals. The attenuation is provided by specially doped fibers caned "attenuation fibers" that provide relatively large amounts of attenuation over a relatively short length. A desired amount of attenuation is accomplished by selecting an attenuation fiber with a select length.

Fiber-based loopback devices have several drawbacks. First, the attenuation range is relatively narrow due to restricted choices of the attenuation fiber. In particular, there are limits to the amount of attenuation that can be achieved using fiber doping and reasonable lengths of attenuation fiber, especially for multimode fibers. Second, attention fiber is expensive. Third, the ability of fiber-based loopback apparatus to only provide different amounts of attenuation limits the ability to perform other desirable optical signal performance evaluations and management.

SUMMARY

An embodiment of the disclosure includes a loopback apparatus for use with a fiber optical system. The loopback apparatus comprises: at least one input optical fiber having input and output ends; at least one output optical fiber having input and output ends; an optical system that defines an optical path and that is configured to optically couple the output end of the at least one input optical fiber with the input end of the at least one output optical fiber over the optical path; and a thin-film filter disposed in the optical path and configured to provide a select amount of attenuation for light traveling over the optical path.

Another embodiment of the disclosure is fiber optical system that comprises: optical equipment having a transmitter and a receiver; an optical fiber cable that includes at least one transmit optical fiber optically coupled to the transmitter and at least one receive optical fiber optically coupled to the receiver. The fiber optical system also comprises a loopback apparatus that includes: at least one input optical fiber optically coupled to the at least one transmit optical fiber; at least one output optical fiber optically coupled to the at least one receive optical fiber; an optical system configured to optically couple the at least one input optical fiber to the at least one output optical fiber over an optical path; and a thin-film filter operably disposed in the optical path and configured to provide a select amount of optical attenuation.

Another embodiment of the disclosure includes a method of evaluating a performance of a fiber optical system that includes optical equipment and an optical fiber cable that supports at least one transmit optical fiber and at least one receive optical fiber. The method comprises: transmitting, from a transmitter in the optical equipment, optical signals over the at least one transmit optical fiber to at least one input optical fiber of a loopback apparatus; sending the optical signals from the at least one input optical fiber to at least one output optical fiber of the loop back apparatus over an optical path, including directing the optical signals to a thin-film filter that resides in the optical path and that is configured to perform filtering of the optical signals to form filtered optical signals; directing the filtered optical signals from the at least one output optical fiber to the at least one receive optical fiber of the optical fiber cable and then to at least one receiver in the optical equipment; and converting the filtered optical signals received by the at least one receiver to electrical signals and then processing the electrical signals.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation.

Likewise, terms such as "front" and "back" are also used herein for convenience and ease of explanation and are not intended to be limiting as to direction or orientation. Also, terms like "input" and "output" are defined by the direction of travel of optical signals or light over an optical path as described below.

The terms "optical signals" and "light" are used interchangeably below, depending on the context of the discussion. The term "filtered optical signals" means optical signals that have been either transmitted through or reflected from the thin-film filter, which is introduced and discussed below. It is noted that reflection from the thin-film filter can be considered as representing transmission into and then out of the thin-film filter when light travels in both the incident direction and the reflected direction. The filtered optical signals can be "power filtered" by the thin-film filter, i.e., wherein the optical power is attenuated substantially equally for all wavelengths, or "spectrally filtered," i.e., wherein the optical power is selectively optically attenuated as a function of wavelength. Each of the power filtering and spectral filtering operations can be said to attenuate the optical signals.

First Transmission Embodiment

Figure 1A:
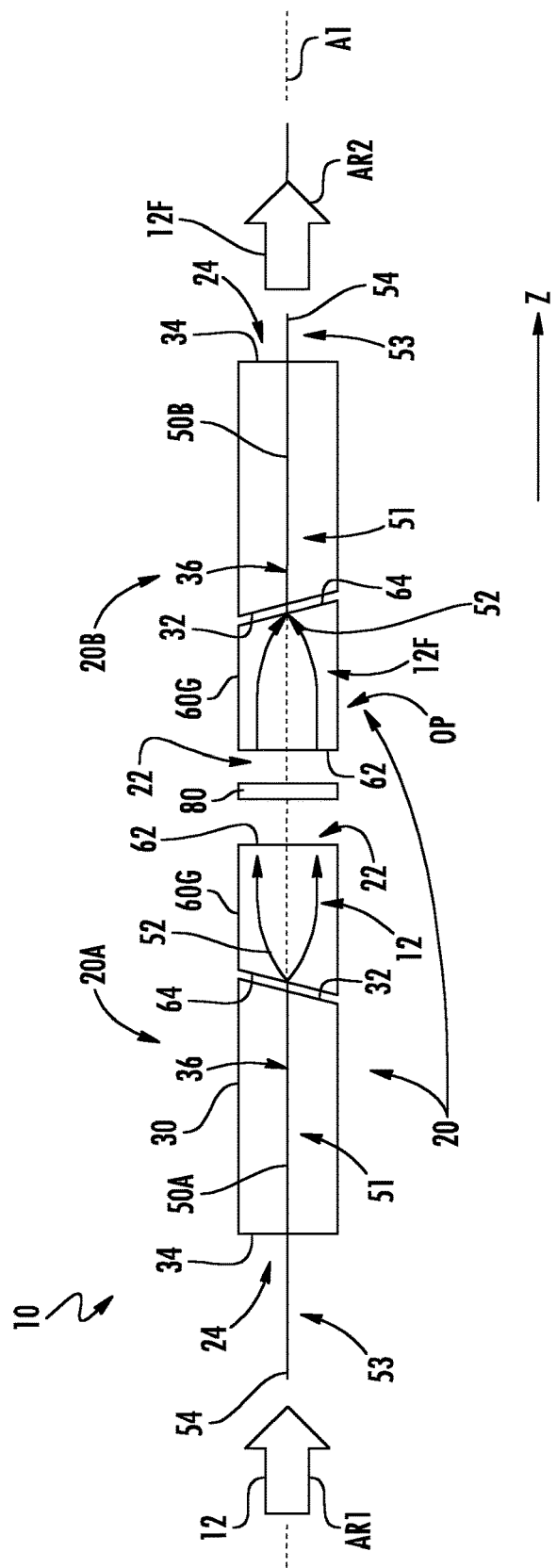
FIG. 1A is a partially exploded close-up side view of an optical system that operates in a transmission mode and that can be used in an example loopback apparatus.

FIG. 1A is a partially exploded close-up side view of an optical system 10 that operates in a transmission mode and that can be used to form an example loopback apparatus 100 as described below. The arrow AR1 shows an input direction of travel of optical signals 12 and the arrow AR2 shows an output direction of travel of filtered optical signals 12F, introduced and discussed below. The example optical system 10 of FIG. 1A includes two collimators 20 disposed along an optical axis A1, which is shown as oriented along a z-axis. The first and second collimators 20 are respectively designated 20A and 20B and are respectively referred to as input and output collimators. Each of the input and output collimators 20A and 20B has a front end 22 and a back end 24. The input and output collimators 20A and 20B are disposed along the optical axis A1 so that their respective front ends 22 are confronting and proximate to each other.

Each of the input and output collimators 20A and 20B includes an optical fiber support member 30 with a front end 32 and a back end 34. In an example, the optical fiber support member 30 is in the form of a ferrule that includes a bore 36 sized to accommodate a front-end portion 51 of an optical fiber 50. The optical fiber support member 30 is sometimes referred to as a "capillary." The combination of the optical fiber support member 30 and the optical fiber 50 is referred to in the art as an "optical fiber pigtail" or just "pigtail" for short.

The front-end section 51 of the optical fiber 50 includes a front end 52 that resides at or proximate to the front end 32 of the optical fiber support member 30. The optical fiber 50 also includes a back-end section 53 with a back end 54. The back-end section 53 can extend from the back end 34 of the optical fiber support member 30, or can reside at the back end 34, or be proximate to the back end 34. The optical fiber 50 of the input collimator 20A is referred to herein as a first or an input optical fiber 50A while the optical fiber of the output collimator 20B is referred to herein as a second or output optical fiber 50B. The front and back ends 52 and 54 of both the input and output optical fibers 50A and 50B define respective front and back end faces. Other embodiments of optical system 10 discussed below have multiple input optical fibers 50A and multiple output optical fibers 50B.

In an example, each of the input and output collimators 20A and 20B also includes a gradient-index (GRIN) lens 60G with a front end 62 and a back end 64. The back end 64 resides proximate to or in contact with the front end 32 of the optical fiber support member 30. The front end 62 is also referred to herein as end face 62. In an example, the front end 32 of the optical fiber support member 30 and the back end 64 of the GRIN lens 60G are angled to reduce back reflections. The confronting GRIN lenses 60G define an optical path OP between the front end 52 of the input optical fiber 50A and the front end 52 of the output optical fiber 50B.

The optical system 10 also includes a thin-film filter (TFF) 80, which is shown residing between the confronting end faces 62 of the two confronting GRIN lenses 60G and thus in the optical path OP. In an example, the TFF 80 resides on the front end 22 of the collimator 20A, i.e., on the end face 62 of the GRIN lens 60G of the input collimator 20A. In another example, the TFF 80 can be sandwiched between the front ends 22 of the input and output collimators 20A and 20B, or even reside on the front end of the output collimator 20B, i.e., on the end face 62 of the GRIN lens 60G of the output collimator 20B.

In an example, the TFF 80 is formed using thin-film deposition techniques known in the art. In an example, the TFF 80 can be formed from layers of dielectric materials of different refractive indices deposited on a glass or polymer substrate. In another example, the TFF 80 can comprise one or more layers of semi-metallic materials, such as metal oxides. The TFF 80 can be configured to provide, for at least one select wavelength of light, an attenuation that in an example can range from 1 decibel (dB) to 10 dB.

In an example, the TFF 80 is formed as a separate element that is added to optical system 10. In another example, the TFF is added directly to a surface of the optical system 10, e.g., to the end face 62 of the GRIN lens 60G of the input collimator 20A. In an example, the TFF 80 is the same as or is similar to (e.g., comprises) a tap filter used for wavelength division multiplexing applications.

Figure 1B:
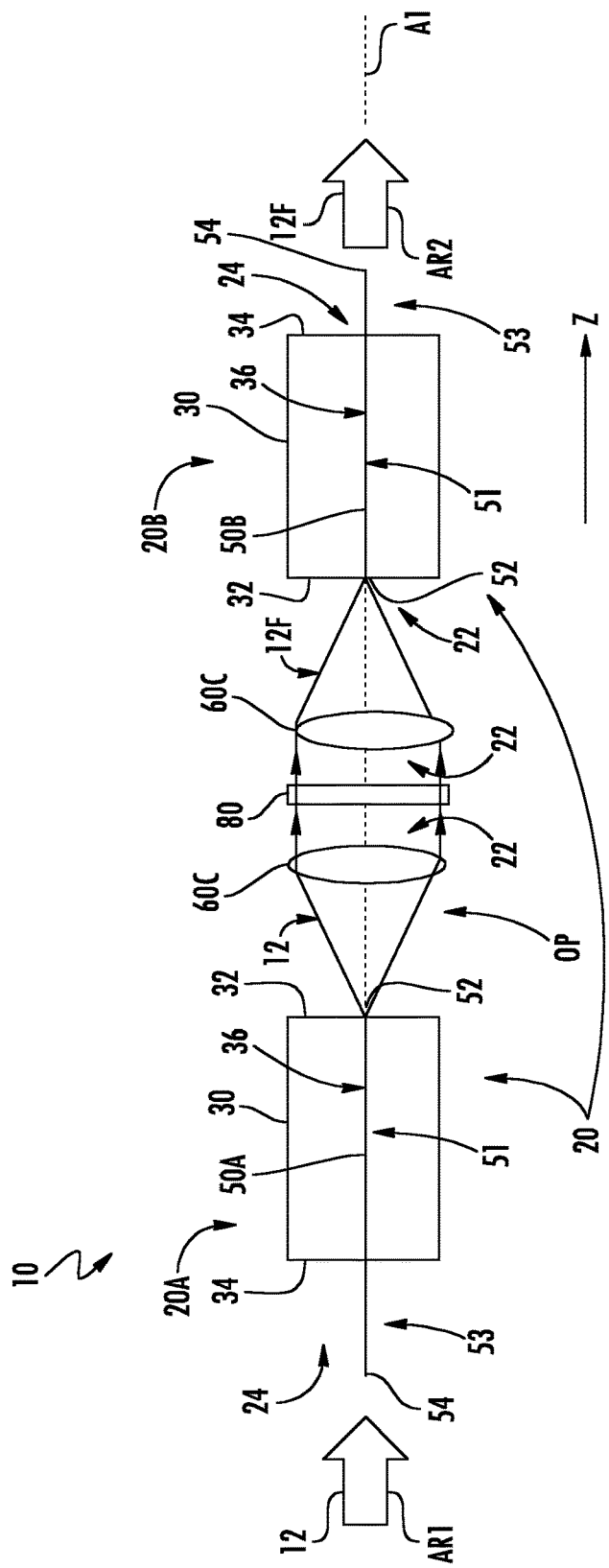
FIG. 1B is similar to FIG. 1A and illustrates an example of the optical system wherein the GRIN lenses are replaced with conventional (i.e., non-GRIN) lenses.

FIG. 1B is similar to FIG. 1A and illustrates an example of the optical system 10 wherein the GRIN lenses 60G are each replaced with a conventional (i.e., non-GRIN) refractive lens 60C. In an example, the lens 60C can consist of a single aspheric element. In an example, the lens 60C can include either a single element or multiple elements configured to perform the same function as the corresponding GRIN lens 60G. In the embodiment of the optical system 10 with lenses 60C, the lenses define the aforementioned optical path OP.

Figure 1C:
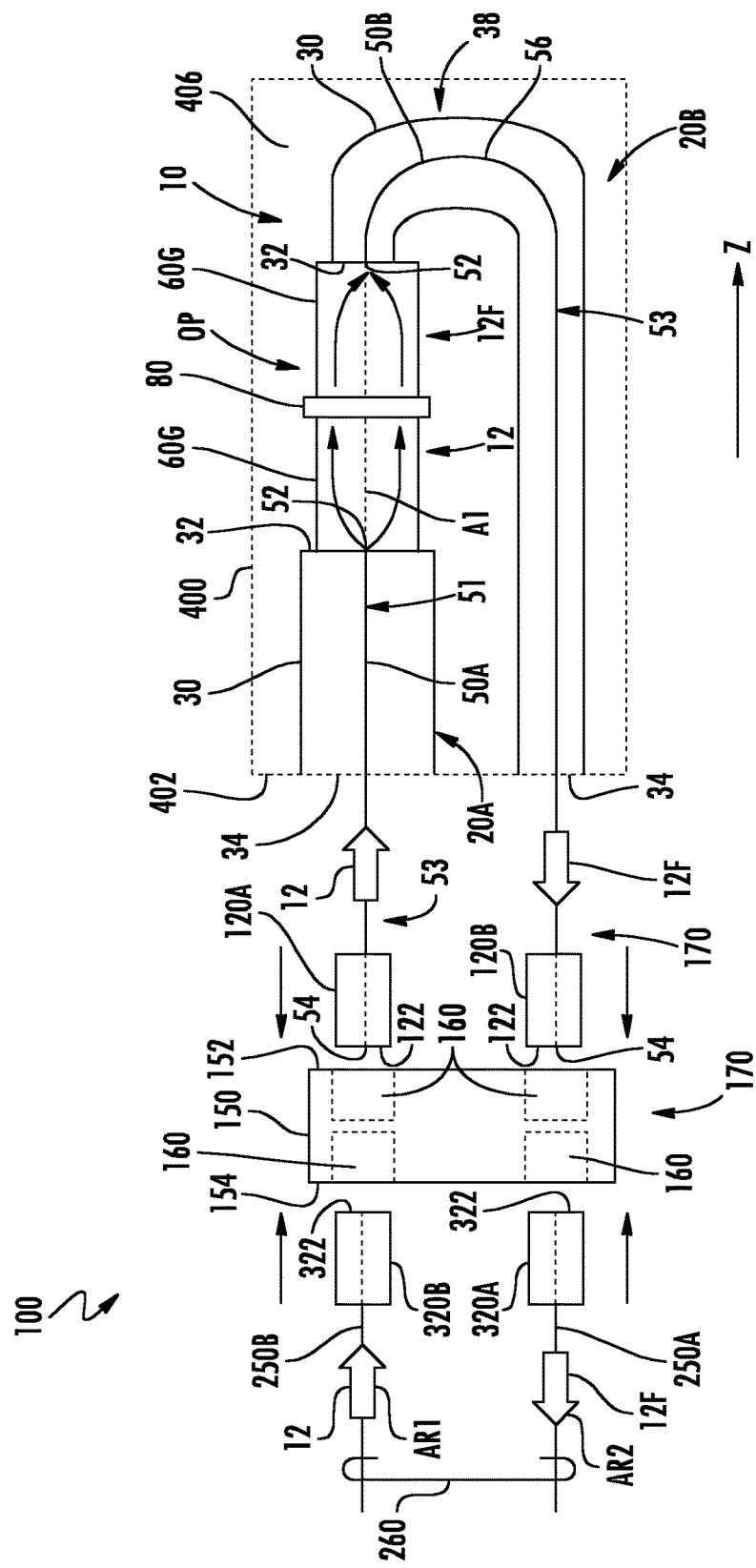
FIG. 1C is a schematic diagram of an example loopback apparatus that includes the optical system of FIG. 1A.

FIG. 1C is a schematic diagram of an example loopback apparatus 100 that includes the optical system 10 of FIG. 1A. The loopback apparatus 100 can alternatively include the optical system 10 of FIG. 1B. The loop back apparatus 100 is described below with the example of FIG. 1A for ease of explanation since the same basic principles apply to both examples.

In an example, the back end 54 of the input optical fiber 50A is supported by an optical fiber connector ("connector") 120A. Likewise, the back end 54 of the output optical fiber 50B is supported by another connector 120B. Each of the connectors 120A and 120B has a front end 122. The connectors 120A and 120B are also respectively referred hereinafter as input and output connectors.

With continuing reference to FIG. 1C, a connector adapter ("adapter") 150 resides adjacent the input and output connectors 120A and 120B. The adapter 150 has opposite front and back ends 152 and 154, with the input and output connectors 120A and 120B shown residing adjacent the front end 152. Also shown in FIG. 1C are two connectorized optical fibers 250A and 250B that have back ends 254 supported by respective connectors 320A and 320B, which are shown residing adjacent the back end 154 of the adapter 150. Each of the connectors 320A and 320B has a front end 322. The optical fibers 250A and 250B are respectively referred to as receive and transmit optical fibers and the corresponding connectors 320A and 320B are respectively referred to herein as receive and transmit connectors.

Figure 1D:
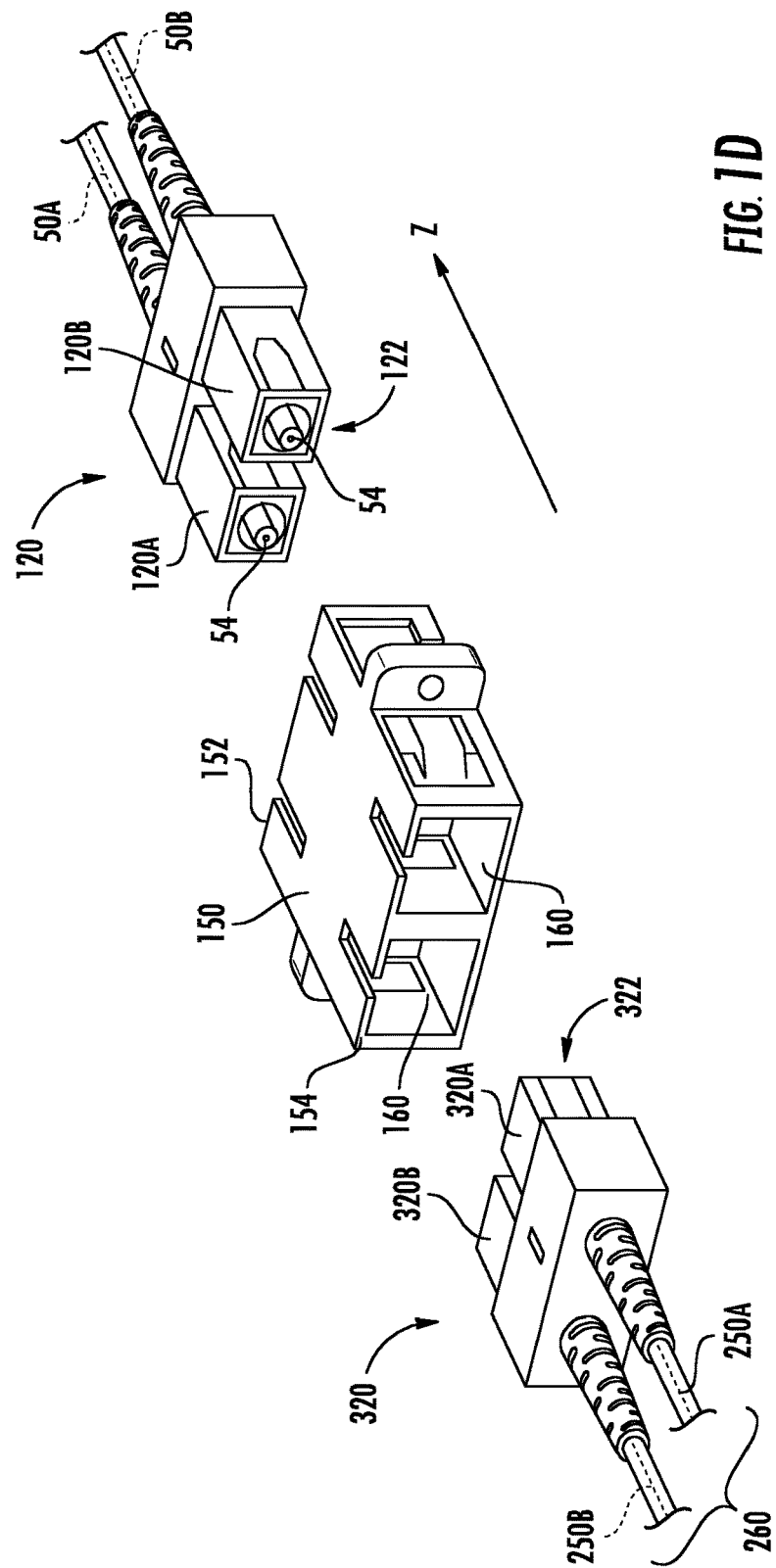
FIG. 1D is an elevated view of input and output connectors of the loopback apparatus along with a connector adapter and transmit and receive connectors of an optical fiber cable of a fiber optical system.

In an example, the receive and transmit optical fibers 250A and 250B are supported by an optical fiber cable ("cable") 260. FIG. 1D is an elevated view of the input and output connectors 120A and 120B of the loopback apparatus 100, the receive and transmit connectors 320A and 320B of the optical fiber cable 260, and the adapter 150 operably disposed between the two sets of connectors. In FIG. 1D, the input and output connectors 120A and 120B and the receive and transmit connectors 320A and 320B are shown by way of example as each comprising a single-fiber LC duplex connector. The cable 260 has a front end 262 that includes the receive and transmit connectors 320A and 320B and also has an opposite back end 264 (see FIG. 1F, introduced and described below). The input and output connectors 120A and 120B can also be combined into or otherwise define a single connector 120. Likewise, the transmit and receive connectors 320A and 320B can also be combined into or otherwise define a single connector 320.

In an example, the adapter 150 includes four receptacles 160, with two of the receptacles on the front side 152 and two on the back side 154. The receptacles 160 are each configured to accommodate one of the four connectors 320A, 320B and 120A, 120B. The adapter 150 is arranged so that can support the transmit connector 320B relative to the input connector 120A with their respective front ends 122 and 332 confronting and in close proximity to one another so that the transmit optical fiber 250B and the input optical fiber 50A are in optical communication. Likewise, the adapter 150 can support the receive connector 320A relative to the output connector 120B with their respective front ends 122 and 332 confronting and in close proximity to one another so that the receive optical fiber 250A and the output optical fiber 50B are in optical communication. The adapter 150 thus serves to define a first optical coupling interface 170 between the receive and transmit optical fibers 320A and 320B of the cable 260 and the input and output optical fibers 50A and 50B of the loopback apparatus 100.

In an example, to obtain the configuration where both the input and output connectors 120A and 120B can be inserted into receptacles 160 at the front end 152 of the receptacle 150, the output optical fiber 50B includes a bend 56, such as the U-shaped bend as shown. In an example shown in FIG. 1C, the bend 56 is maintained by providing the corresponding optical fiber support member 30 with a U-shaped bend 38. The optical fiber support member 30 of collimator 20A can be formed so that its back end 34 resides at or near the same plane as the back end 34 of the optical fiber support member 30 of the collimator 20A.

Figure 1E:
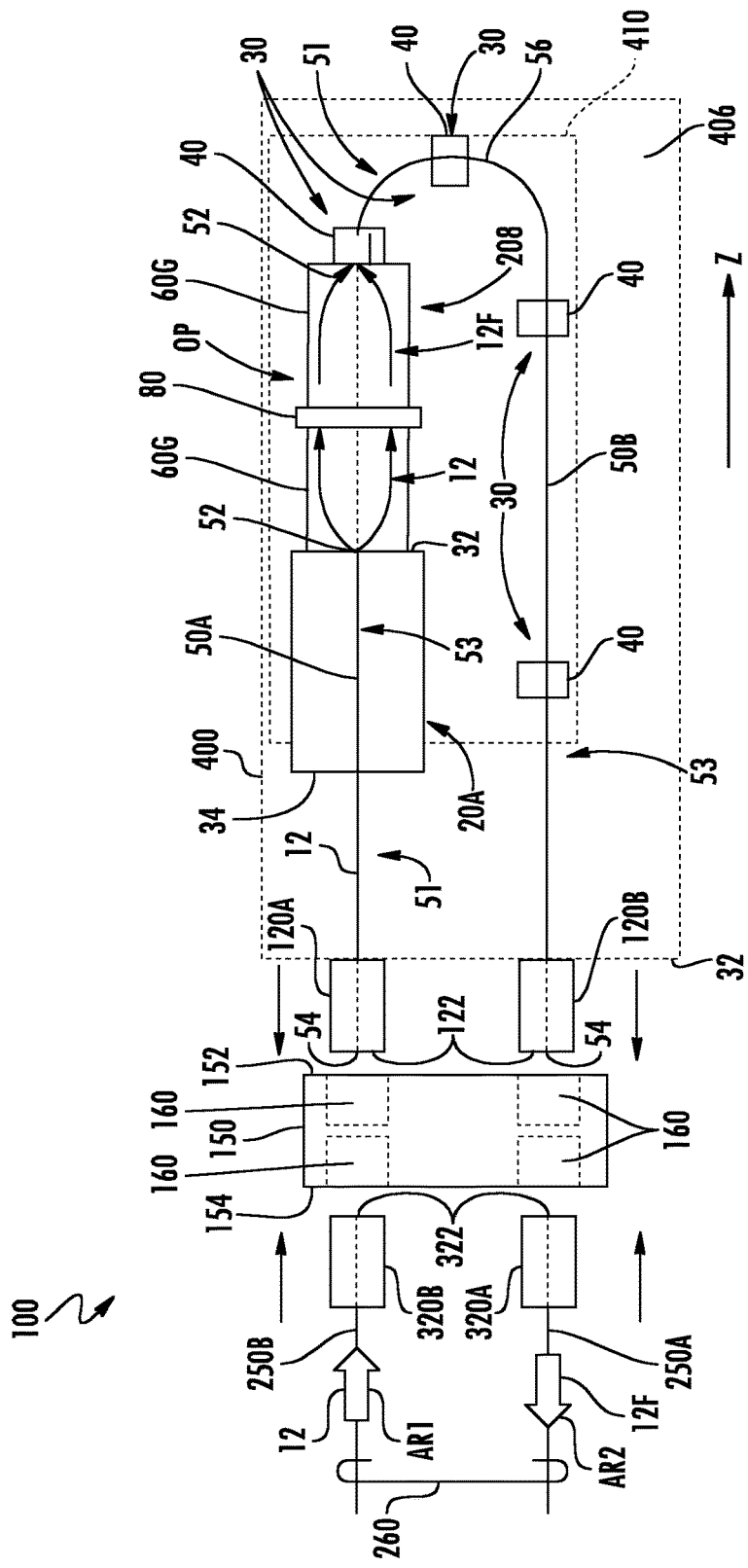
FIG. 1E is similar to FIG. 1C and shows an example loopback apparatus that replaces the optical fiber support member of the output optical fiber collimator with guide members.

FIG. 1E is similar to FIG. 1C and shows an example wherein optical fiber support member 30 for collimator 30B comprises guide members 40 arranged to maintain the U-shaped bend 56 and guide the fiber back in the direction toward the adapter 150 (i.e., in the −z direction), as shown in FIG. 1E.

In the example shown in FIG. 1C, the loopback apparatus 100 includes a housing 400 with first end 401 and an interior 406. In an example, the optical system 100 resides at least partially within the housing interior 406. The input and output connectors 120A and 120B and the adapter 150 allow for the loopback apparatus 100 to be "pluggable," i.e., the input and output fibers 50A and 50B supported by the input and output connectors can be optically coupled to the receive and transmit optical fibers 250A and 250B carried by cable 260 and supported by the receive and transmit connectors 320A and 320B by using the adapter 150. In an example, the input and output connectors 120A and 120B can be supported at the front end 402 of the housing, as shown in FIG. 1E. In another example, the input and output optical fibers 50A and 50B can extend beyond the front end 402 of the housing, as shown in FIG. 1C. In another example, the adapter 150 can be supported at or incorporated into the first end 401 of the housing 40 and can be considered part of the loopback assembly.

In the example shown in FIG. 1E, the loopback apparatus 100 can include a support member 410 that resides at least partially within the interior 406 of the housing 500 and that supports the optical system 10. In an example, the support member 410 can be a wall (e.g., sidewall, base, or ceiling) of the housing 400. In another example, the support member 410 can be secured to the housing 400.

1. Method of Operation

Figure 1F:
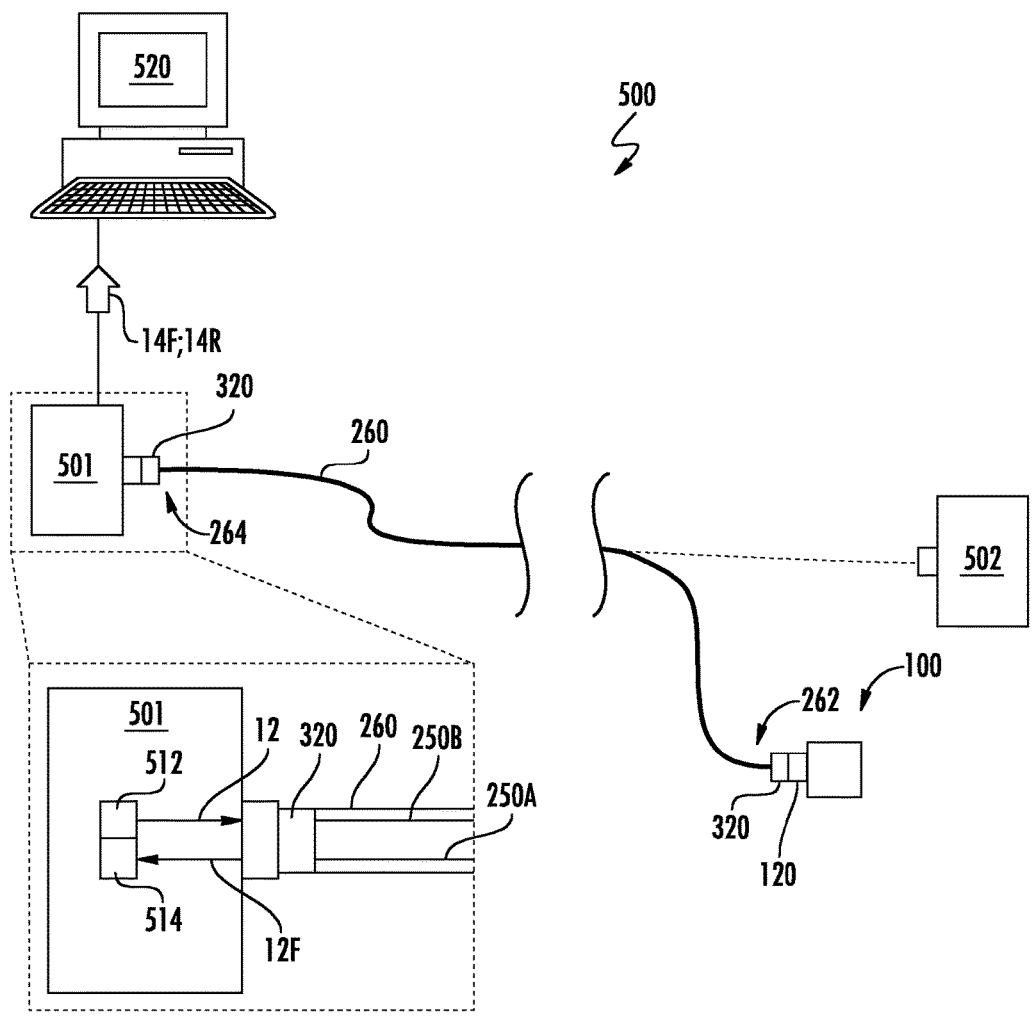
FIG. 1F is a schematic diagram of a fiber optical system that shows a loopback apparatus operably connected to one end of the optical fiber cable of the fiber optical system.

FIG. 1F is a schematic diagram of a fiber optical system 500 that includes first optical equipment 501 and second optical equipment 502 optically connected by the cable 260 at the back and front ends 264 and 262, respectively. The first optical equipment 501 includes a transmitter 512 and a receiver 514, as shown in the close-up inset of FIG. 1F. The receiver 514 is configured to receive filtered optical signals 12F and convert them to corresponding electrical signals 14F.

The dashed-line portion of cable 260 shows how the cable 260 is usually operably connected to the second equipment 502 to form an optical link between the first optical equipment 501 and the second optical equipment. In FIG. 1F, the front end 262 of the cable 260 is disconnected from the second optical equipment 502 and is operably connected to the loopback apparatus 100, which can be the example loopback apparatus as described above or one of the other examples described below.

The fiber optical system 500 also includes a controller 520 electrically connected to the first optical equipment 501. The controller 520 can include a computer (e.g., a processor) that can receive and process the electrical signals 14F to evaluate the performance of the fiber optical system and in particular the transmission of the optical signals 12 that travel in transmit and receive directions over the cable 260. This evaluation can include comparing the electrical signals 14F generated from the filtered optical signals 12F and comparing them to the reference electrical signals 14R that represent the expected optical transmission performance. The reference electrical signals 14R can also be stored directly in the controller 520, and are shown as being transmitted to the controller for the sake of illustration.

The optical fiber system 500 generates the optical signals 12 using the transmitter 512 in the first optical equipment 501. The optical signals 12 travel down the corresponding transmit optical fiber 250B of cable 260. The optical signals 12 then travels across the first optical coupling interface 170 in a first direction (i.e., the +z direction) and are optically coupled into the corresponding input optical fiber 50A of the loopback apparatus 100 at the back end 54 of the input optical fiber. The optical signals 12 then travel over the input optical fiber 50A as a guided wave until they reach the front end 152 of the input optical fiber, wherein the front end 152 resides proximate to or in contact with the back end 64 of the GRIN lens 60G. At this point, the optical signals 12 enter the GRIN lens 60G and travel over the optical path OP. Initially the light associated with optical signals 12 diverges upon exiting the front end 152 of input optical fiber 50. However, the GRIN lens 60G is configured as a collimator that takes the diverging light and substantially collimates it by the time it reaches the front end 64 of the GRIN lens.

The substantially collimated light of the optical signals 12 then passes through TFF 80 to form the aforementioned filtered optical signals 12F. The filtered optical signals 12F then enter the back end 64 of the GRIN lens 60G of the output collimator 20B. This GRIN lens 60G directs the optical signals 12F onto the front end 52 of the output optical fiber 50B of the output collimator 20B. Thus, the TFF 80 resides at a second optical coupling interface 90 between the input optical fiber 50A and the output optical fiber 50B.

The filtered optical signals 12F then travel as a guided wave over the output optical fiber 50B to its back end 54, which as noted above is supported by output connector 250B. The filtered optical signals 12F then travel across the optical interface 170 in a second direction (i.e., the −z direction) opposite to the first direction and enter the receive optical fiber 250A of cable 160 and travel back to the first optical equipment 501, where the filtered optical signals are received by the receiver 514 therein and converted to the electrical signals 14F.

As noted above, this loopback optical path of the optical signals 12 allows for a user of the fiber optical system 500 to assess the performance of the system while working from one end, e.g., using the first optical equipment 501 in combination with the loopback apparatus 100.

It is also noted that in the first transmission embodiment, the front and back ends 52 and 54 of the input optical fiber 50A are used as output and input ends respectively, while the corresponding front and back ends of the output optical fiber 50B are used as input and output ends, respectively, based on the direction of travel of the optical signals 12 and the filtered optical signals 12F over the optical path OP. It is also noted that the description above utilizes a single input optical fiber 50A and a single output optical fiber 50B. Other embodiments can employ multiple input optical fibers 50A and multiple output optical fibers 50B, such as described below.

First Reflection Embodiment

Figure 2A:
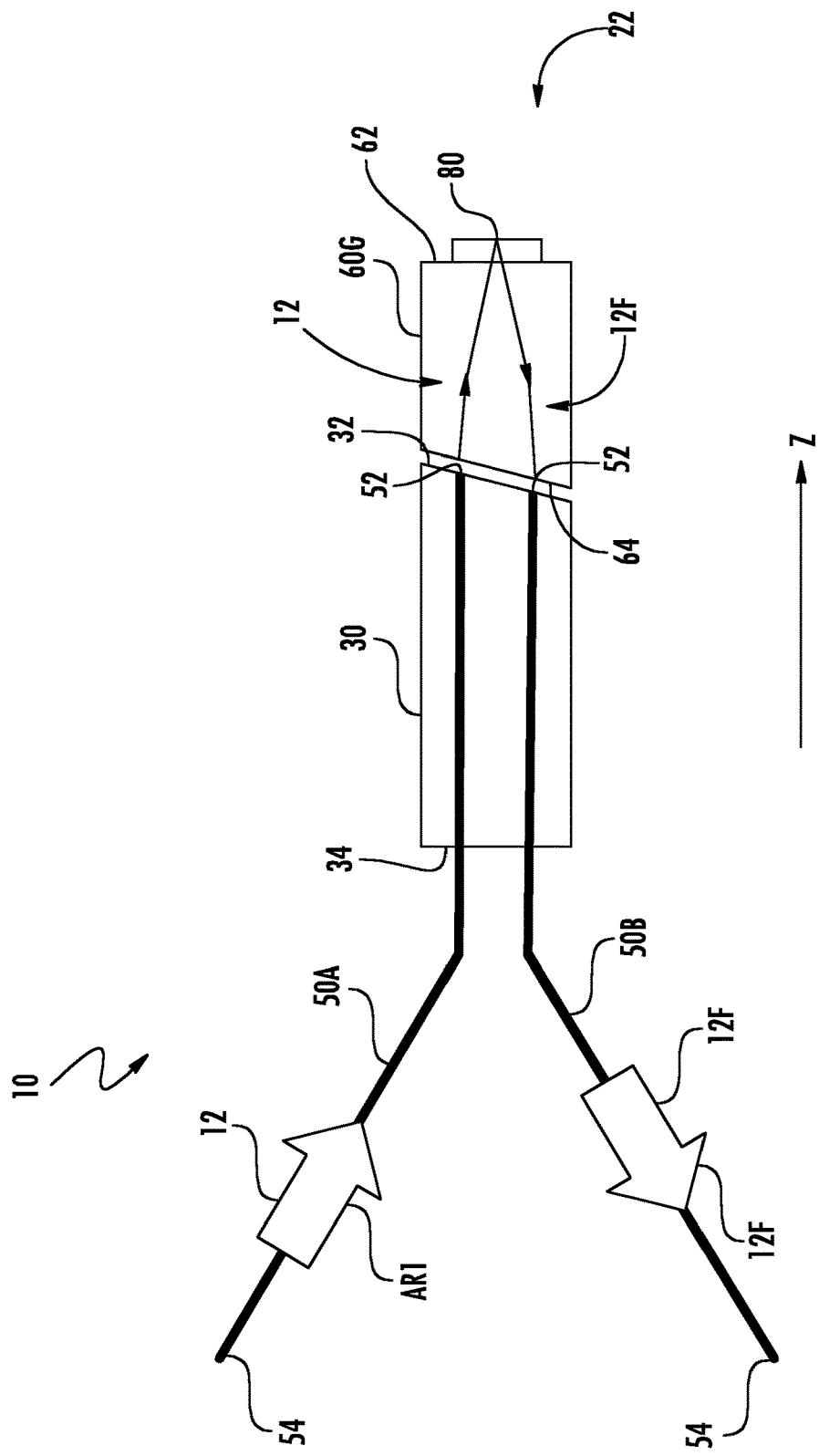
FIGS. 2A and 2B are close-up side views of example optical systems that operate in a reflection mode and that can be used in an example loopback apparatus.

FIG. 2A is a schematic diagram of an example embodiment of the optical system 10 that operates in a reflection mode. The optical system 10 of FIG. 2A has only a single collimator 20 but the optical fiber support member 30 of the single collimator supports both the input and output optical fibers 50A and 50B. The TFF filter 80 resides on the end face 62 of the GRIN lens 60G. The TFF 80 is reflective and thus defines a portion of the second optical coupling interface 90 between the input and output optical fibers 50A and 50B. The optical path OP of the optical system 10 of FIG. 2A is defined by the end face 62 of the GRIN lens 60G and the reflective TFF 80. Note that the optical path OP is folded, i.e., goes in the +z and −z directions due to the reflection from the TFF 80.

Figure 2B:
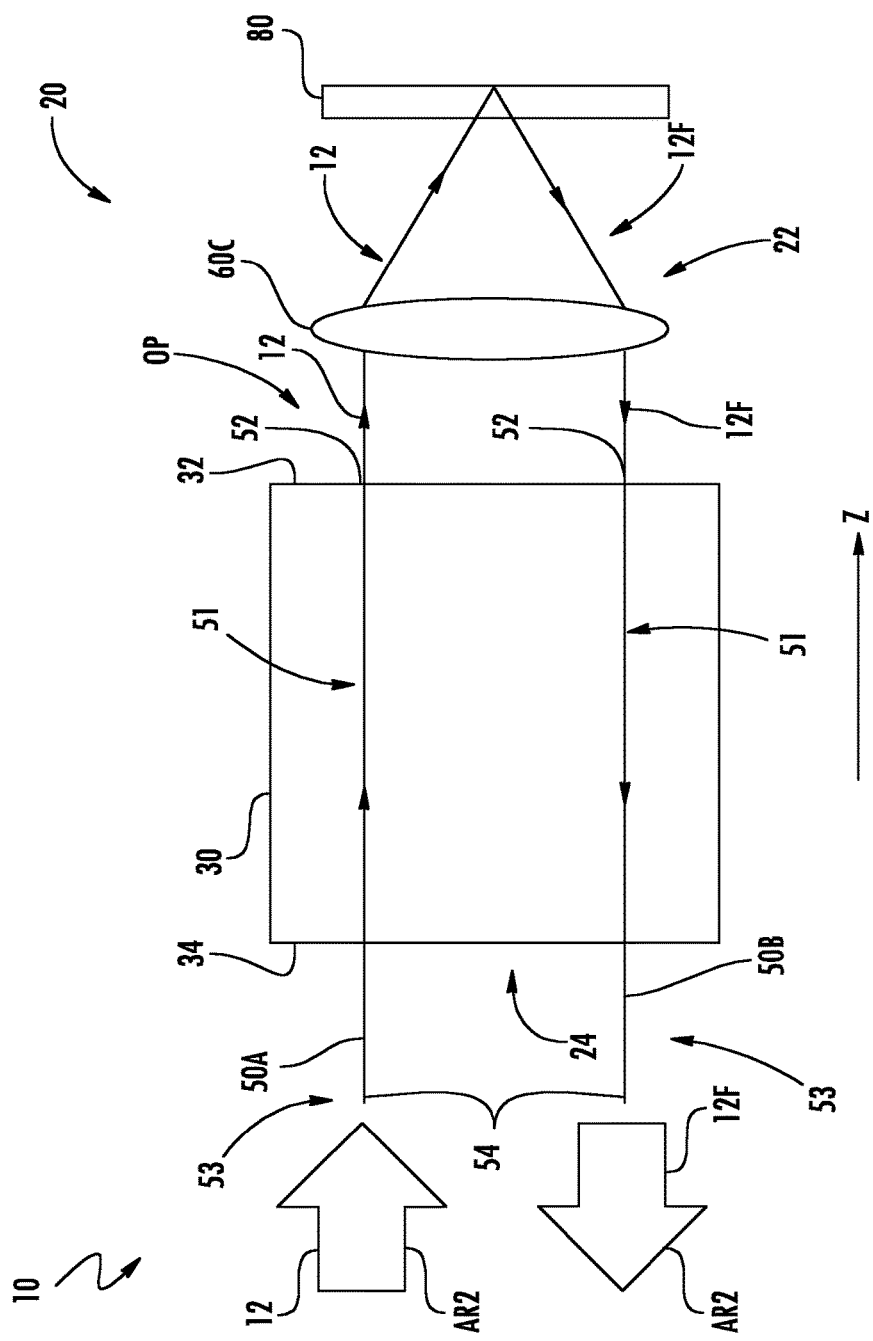

FIG. 2B is similar to FIG. 1A except that the GRIN lens 60G is replaced by a conventional refractive lens 60C similar to the optical system of FIG. 1B.

Figure 2C:
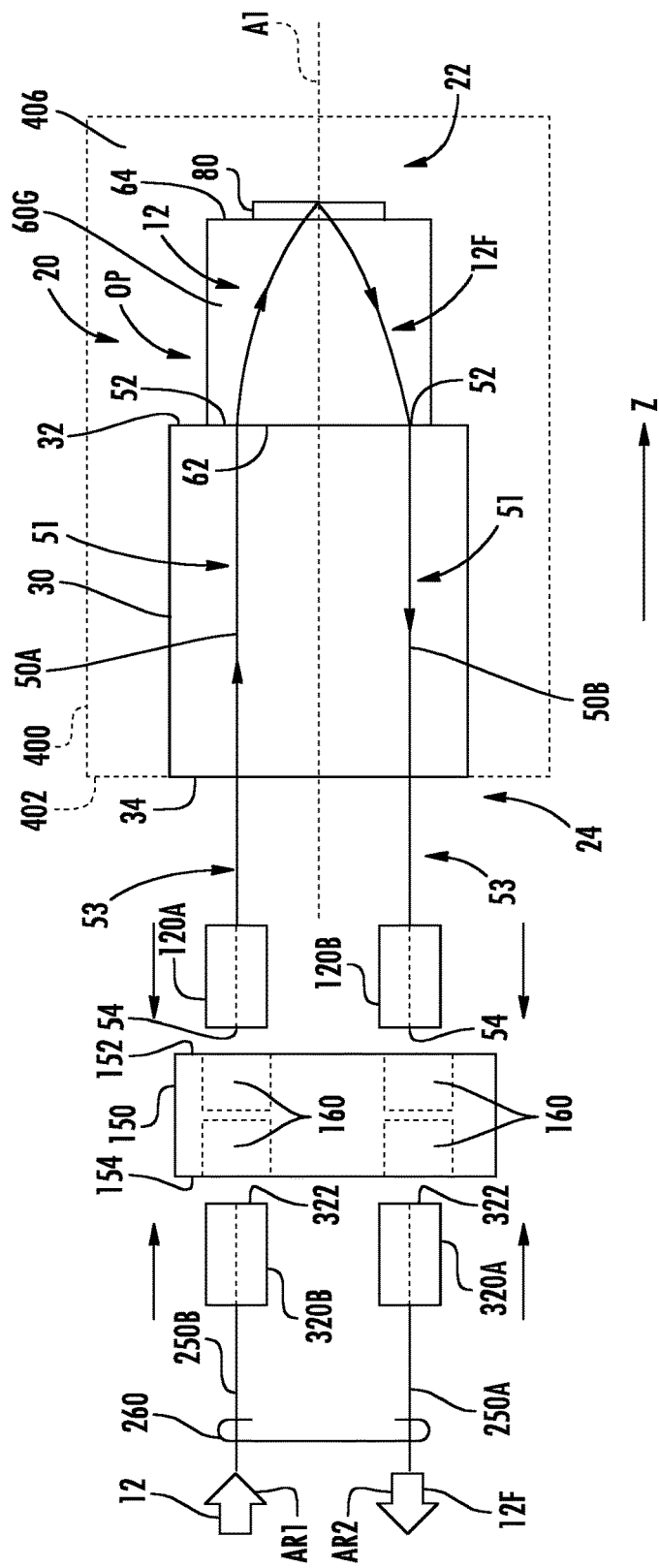
FIG. 2C is a schematic diagram of an example loopback apparatus that includes the optical system of FIG. 2A.

FIG. 2C is a schematic diagram of an example of the loopback apparatus 100 based on the reflective optical system 10 of FIG. 2A. A benefit of the reflection configuration of apparatus 100 is that it is more compact and requires fewer components, e.g., needs only a single optical fiber support member 30 rather than two optical fiber support members as used in the transmission embodiment described above.

The GRIN lens 60G is configured as a collimator, wherein optical signals 12 exiting the front end 52 of the input optical fiber 50A are refracted to intersect the optical axis A1 at the TFF 80. The optical signals 12 are filtered upon reflection by the TFF 80 to form the filtered optical signals 12F. The filtered optical signals 12F then travel back to the end face 62 of the GRIN lens 60G. The GRIN lens 60G then optically couples the filtered optical signals 12F into the front end 52 of the output optical fiber 50B, whereupon the filtered optical signals travel therein as a guided wave towards the back end 54 of the output optical fiber.

Figure 2D:
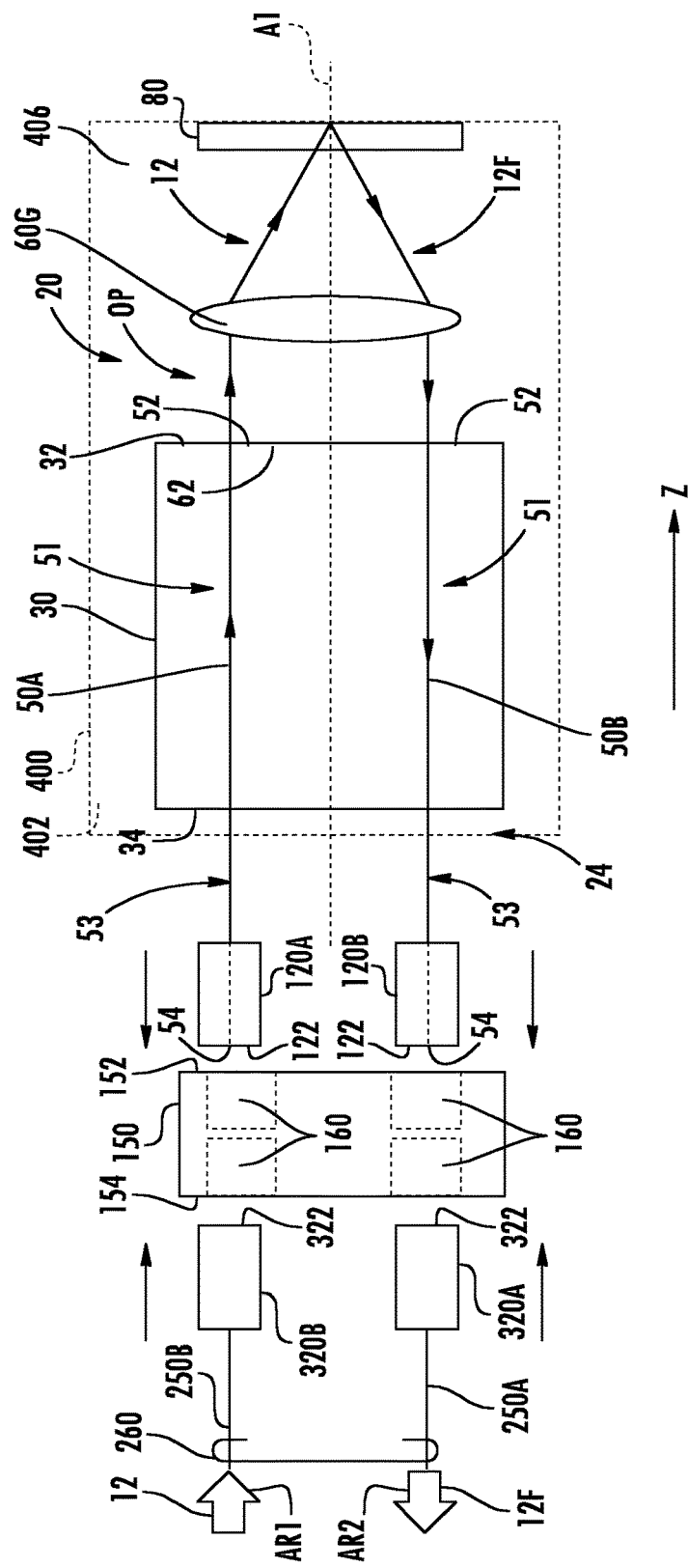
FIG. 2D is a schematic diagram of an example loopback apparatus that includes the optical system of FIG. 2B.

FIG. 2D is similar to FIG. 2C except that the in the optical system 10, the GRIN lens 60G is replaced by the conventional refractive lens 60C.

The operation of the fiber optical system 500 using the reflection embodiment of the loopback apparatus 100 is essentially the same as described above for the transmission embodiment, with the filtered optical signals 12F being formed by reflection from the TFF 80 rather than by transmission. Like the first transmission embodiment, in this first reflection embodiment the front and back ends 52 and 54 of the input optical fiber 50A are used as output and input ends respectively, while the corresponding front and back ends of the output optical fiber 50B are used as input and output ends, respectively, based on the direction of travel of the optical signals 12 and the filtered optical signals 12F over the optical path OP.

The reflection embodiment makes for a more compact loopback apparatus 100, e.g., it can be about half the size of the transmission embodiment. Note also that the reflection embodiment makes it easier for the input and output connectors 120A and 120B to reside in the same plane, e.g., at the first end 401 of the housing 400. In this regard, the reflection embodiment obviates the need for a bend 56 in the output optical fiber 50B. This can be an important advantage where bending losses in the output optical fiber 50B need to be kept to a minimum.

Second Transmission Embodiment

Figure 3A:
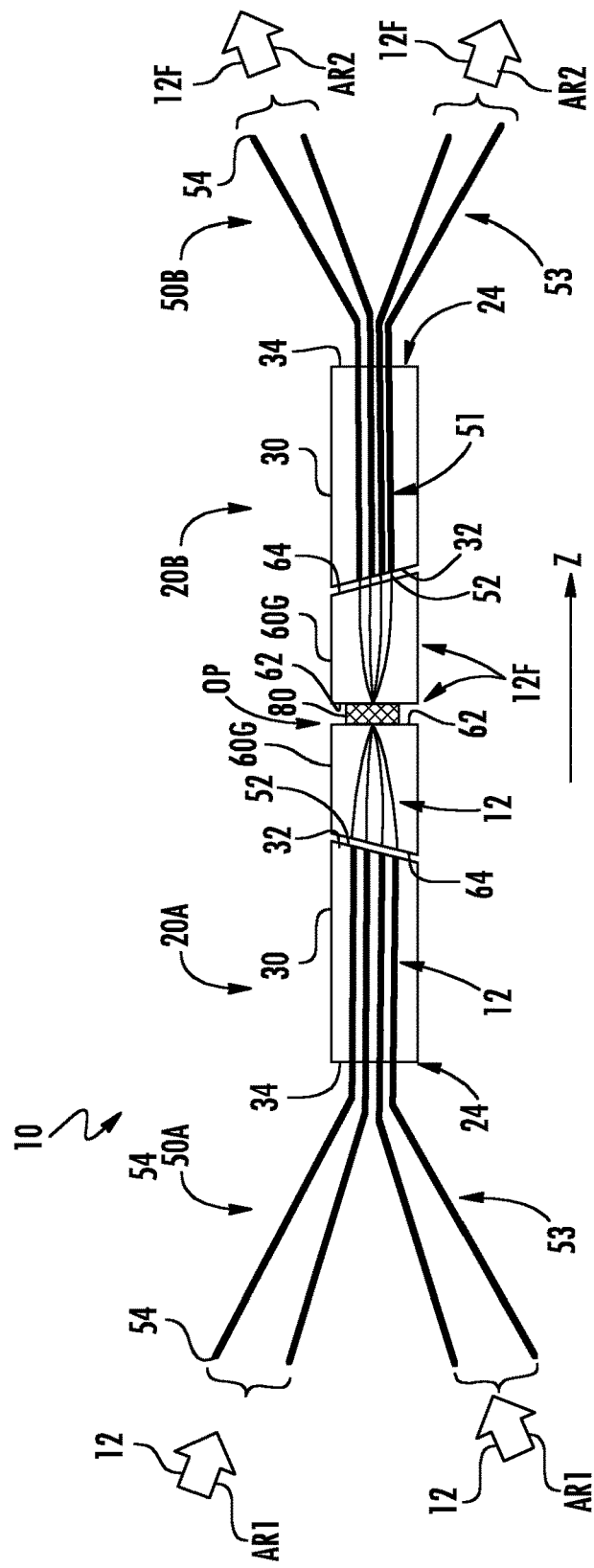
FIG. 3A is a close-up side view of an example optical system similar that of FIG. 1A that operates in a transmission mode but that includes multiple input optical fibers and multiple output optical fibers.

FIG. 3A is similar to FIG. 1A and illustrates an embodiment of the optical system 10 that operates in a transmission mode but wherein the input collimator 20A supports multiple input optical fibers 50A and the output collimator 20B supports multiple output optical fibers 50B. In an example, there are N input optical fibers 50A and the same number N of output optical fibers 50B. In the example shown in FIG. 3A, there are N=4 input optical fibers 50A and N=4 output optical fibers 50B. In other examples, N can be greater than 4, e.g., 8, 12, etc.

Figure 3B:
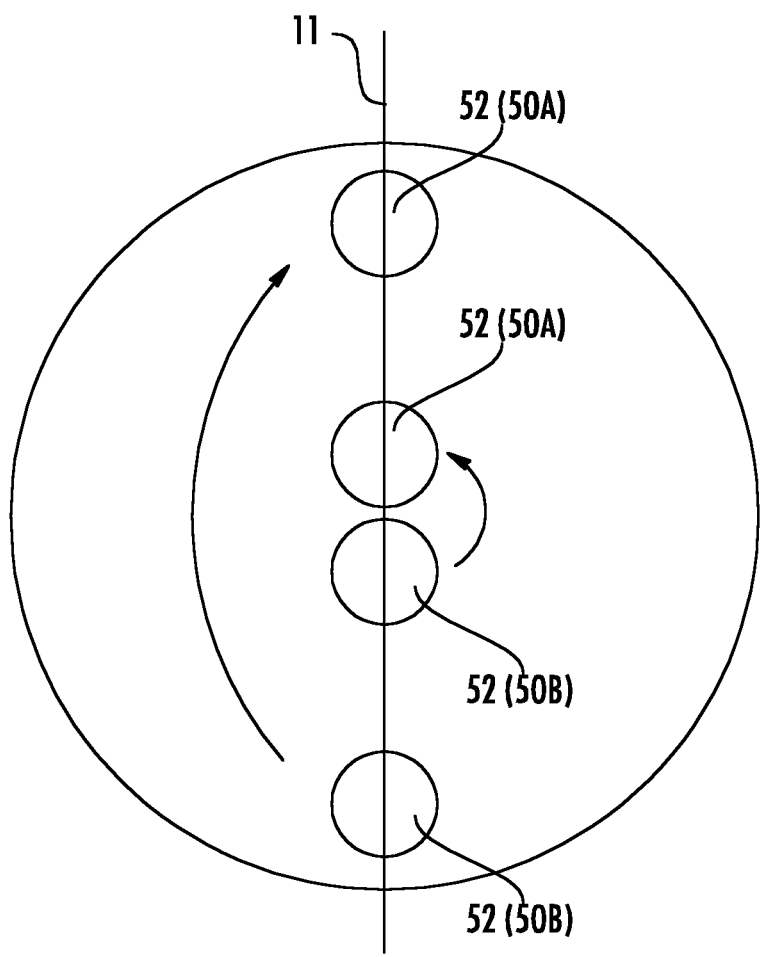
FIG. 3B is a mapping diagram for the optical system of FIG. 3A that shows an example of how the four input and four output optical fibers can be optical communication at an optical coupling interface.

FIG. 3B is a mapping diagram that shows an example of how the input and output optical fibers 50A and 50B can be in optical communication via the second optical coupling interface 90. Other mapping configurations can also be used, with symmetrical mappings preferred. By employing a symmetric arrangement of the input and output optical fibers 50A and 50B, the optical signals 12 that travel over the two different paths experience the same attenuation after traveling through the optical system. In the example shown, the optical communication across the second optical coupling interface 90 is configured to be linear, i.e., the end faces 52 of the input and output optical fibers lie along a line L1.

Figure 3C:
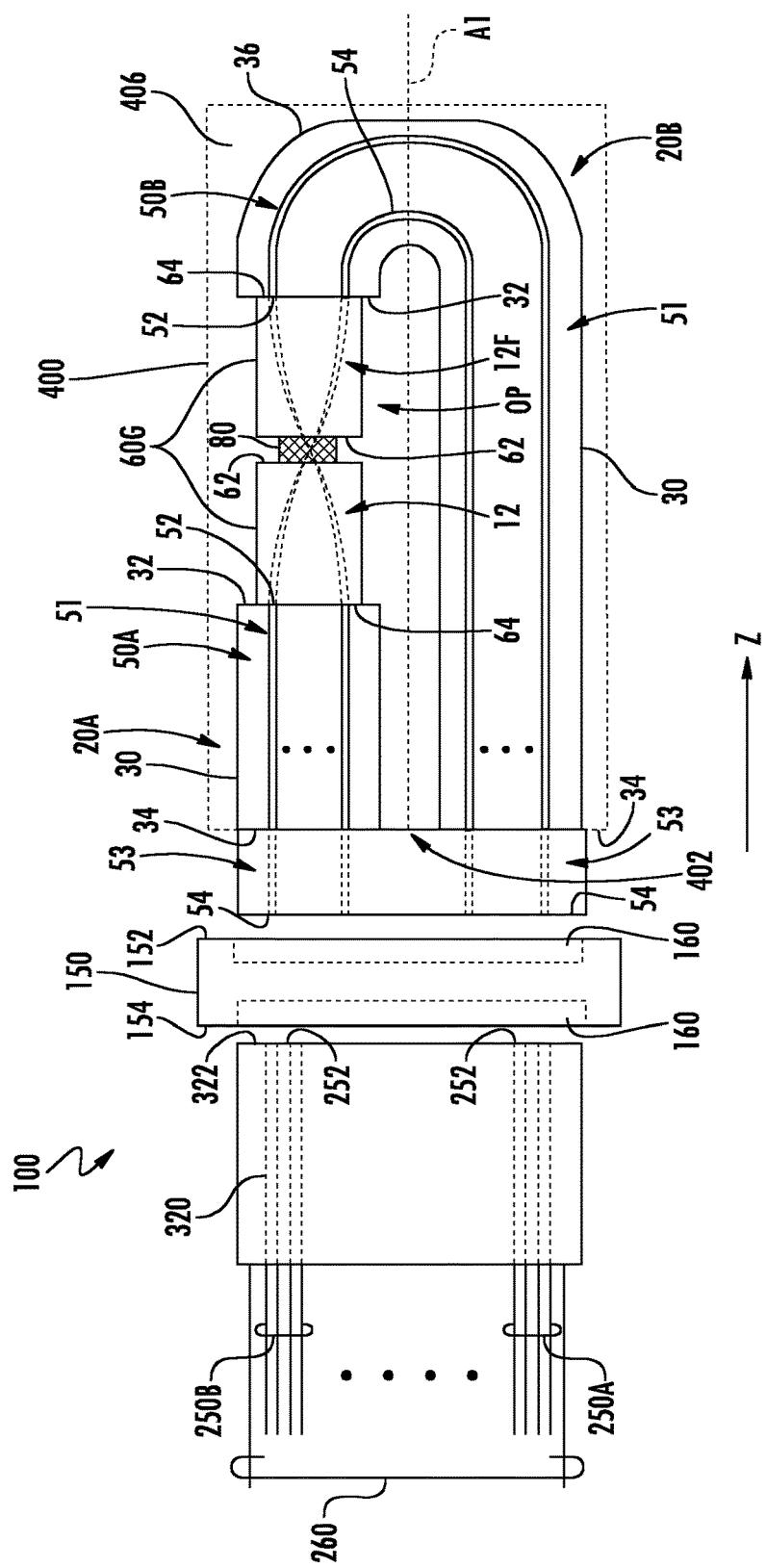
FIG. 3C is a schematic diagram of an example loopback apparatus that includes the optical system of FIG. 3A.

FIG. 3C is a schematic diagram of the loopback apparatus 100 similar to that of FIG. 1B and that includes the optical system 10 of FIG. 3A. The loopback apparatus 100 includes by way of example a single multifiber connector 120 that supports the back ends 54 of both the input optical fibers 50A and the output optical fibers 50B. Likewise, the optical fiber support member 30 is configured to supports bends 56 in each of the multiple output optical fibers 50B. In an example, the multifiber optical fiber support member 30 comprises a section of an optical fiber ribbon cable or a molded ferrule.

In addition, the cable 260 is shown by way of example as having a single multifiber connector ("cable connector") 320 that supports the front ends 262 of multiple receive optical fibers 250A and multiple transmit optical fibers 250B. In an example, each of the multifiber connectors 120 and 320 is a multifiber push-on/pull-off (MPO) connectors. In an example, the adapter 150 includes two MPO receptacles 160, one on the front side 152 configured to receive the multifiber connector 120 and one on the back side 154 configured to receive the cable connector 320.

The operation of the loopback apparatus 100 in the optical fiber system 500 is similar to that as described above, but with optical signals 12 traveling over the multiple transmit optical fibers 250B and returning over the multiple receive optical fibers 250A as the filtered optical signals 12F. It is noted that the loopback apparatus 100 of FIG. 3C can also employ the optical system 10 of FIG. 1B, which includes the conventional refractive lenses 60C.

Second Reflection Embodiment

Figure 4A:
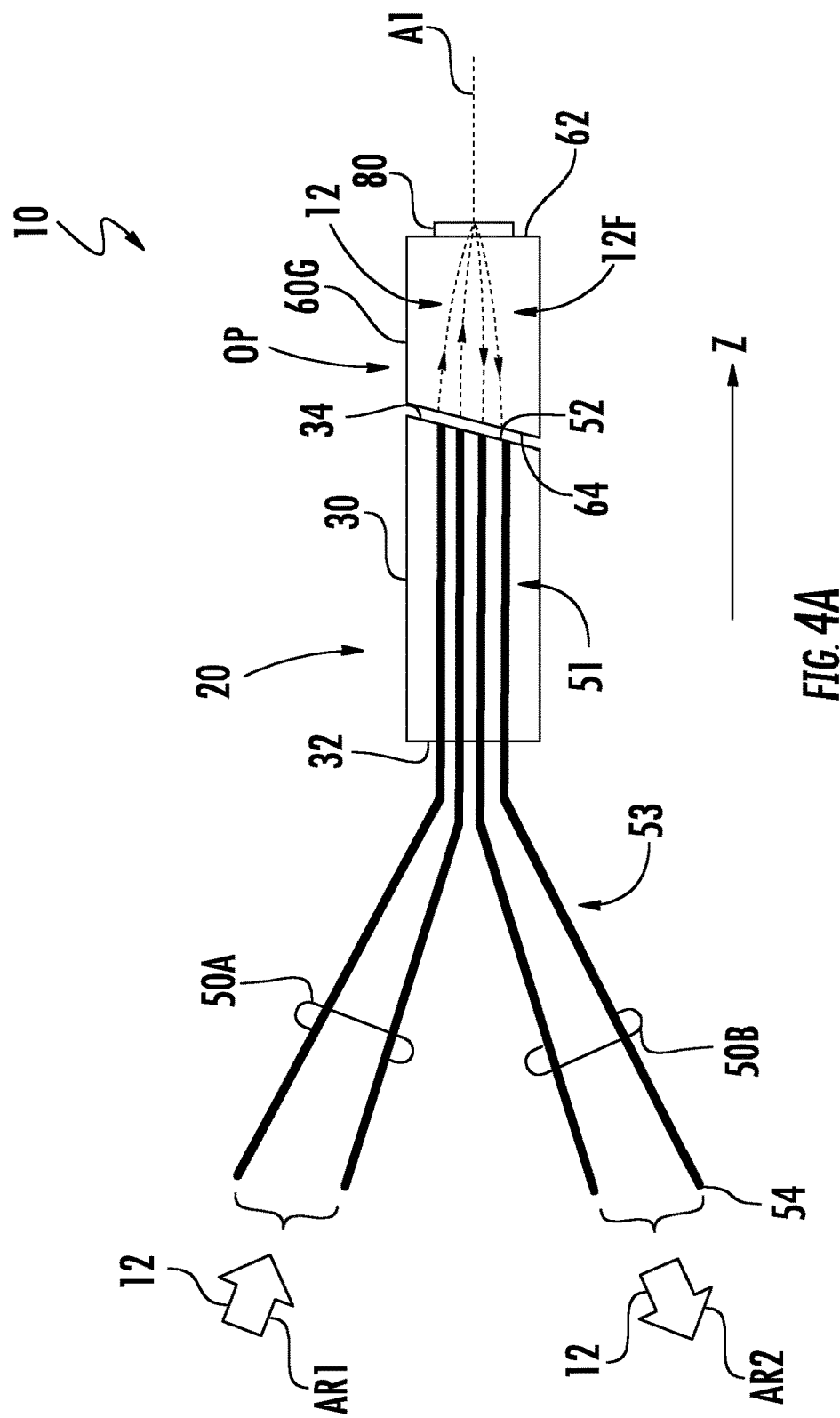
FIG. 4A is a close-up side view of an example optical system similar to that of FIG. 2A that operates in a reflection mode but that includes multiple input optical fibers and multiple output optical fibers.
Figure 4B:
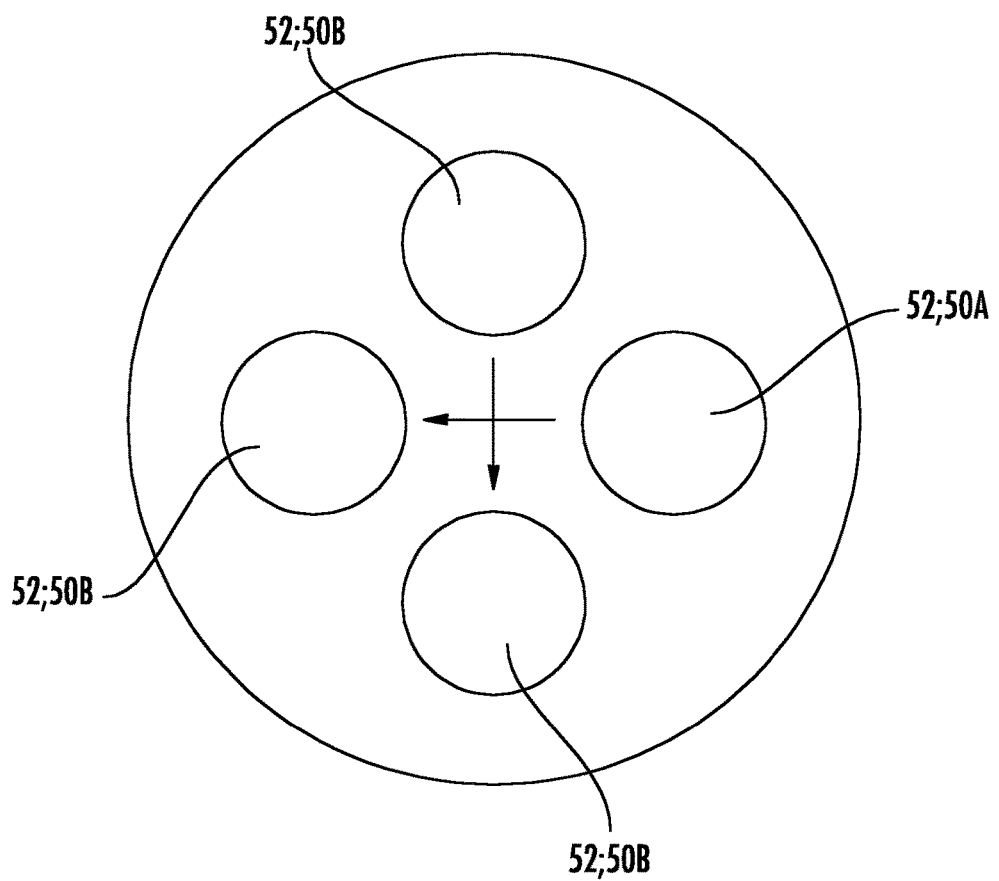
FIG. 4B is similar to FIG. 3B and is a mapping diagram that shows an example of how two input and two output optical fibers can be in optical communication at an optical coupling interface.

FIG. 4A is similar to FIG. 2A and shows an example optical system 100 that operates in a reflection mode but wherein the collimator 20 includes multiple (N) input optical fibers 50A and multiple (N) output optical fibers 50B. FIG. 4B is similar to FIG. 3B and is a mapping diagram that shows an example of how two input output optical fibers 50A and two output optical fibers 50B can be in optical communication via the second optical coupling interface 90.

Figure 4C:
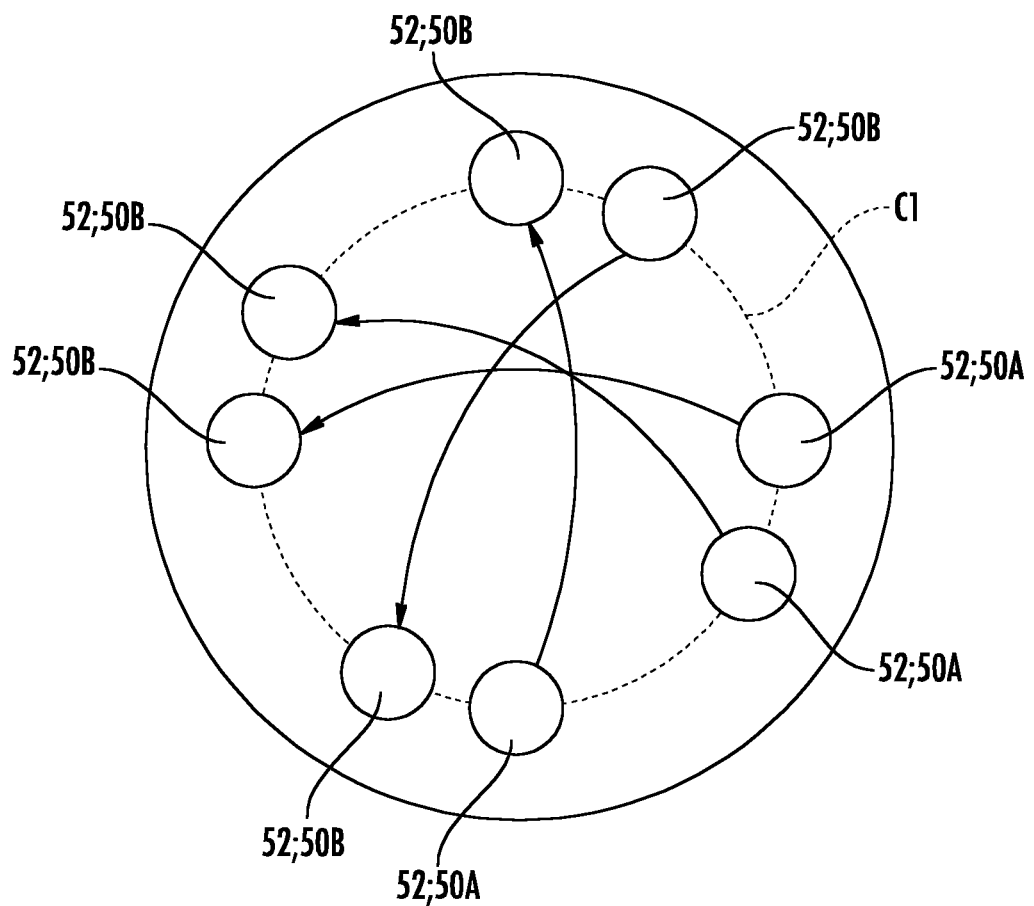
FIG. 4C is a mapping diagram similar to that of FIG. 4B but for an example that uses four input and four output optical fibers.

FIG. 4C is a mapping diagram similar to FIG. 4B but for four input output optical fibers 50A and four output optical fibers 50B. Again, by employing a symmetric arrangement of the input and output optical fibers 50A and 50B, the optical signals 12 that travel over different paths experience the same attenuation after traveling through the optical system 10. Note also that the configuration for the front ends 52 of the input and output optical fibers 50A and 50B associated with the second optical interface 90 is circular, i.e., the ends are arranged on a circle C1. As noted above, a variety of different mapping configurations can be used for both the transmission and reflection modes for any reasonable number N of input and output optical fibers 50A and 50B.

Figure 4D:
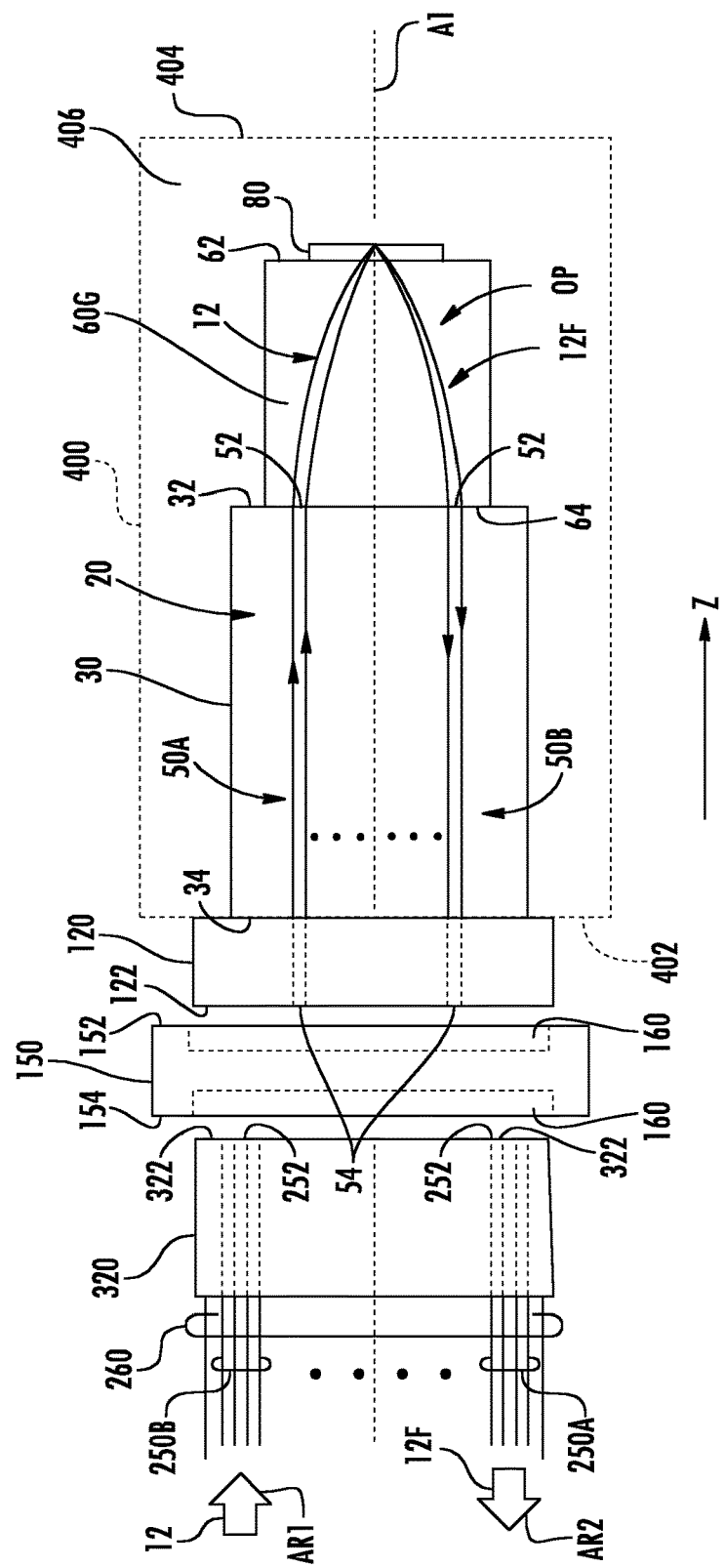
FIG. 4D is a schematic diagram of an example loopback apparatus that includes the optical system of FIG. 4A.

FIG. 4D is a schematic diagram of an example loopback apparatus 100 that includes the optical system of FIG. 4A. As with the multifiber transmission embodiment of the loopback apparatus of FIG. 3C, the multifiber reflection embodiment includes a single multifiber connector 120 that supports the output ends 54 of the input optical fibers 50A and the output optical fibers 50B. In an example, the multifiber optical fiber support member 30 comprises a section of an optical fiber ribbon cable or a molded ferrule.

In addition, the cable 260 has a single multifiber cable connector 320 that supports the front ends 262 of multiple receive optical fibers 250A and the multiple transmit optical fibers 250B. In an example, the multifiber connectors 120 and 320 are multifiber push-on/pull-off (MPO) connectors. In an example, the adapter 150 includes two MPO receptacles 160, one on the front side 152 and one on the back side 154.

Figure 4E:
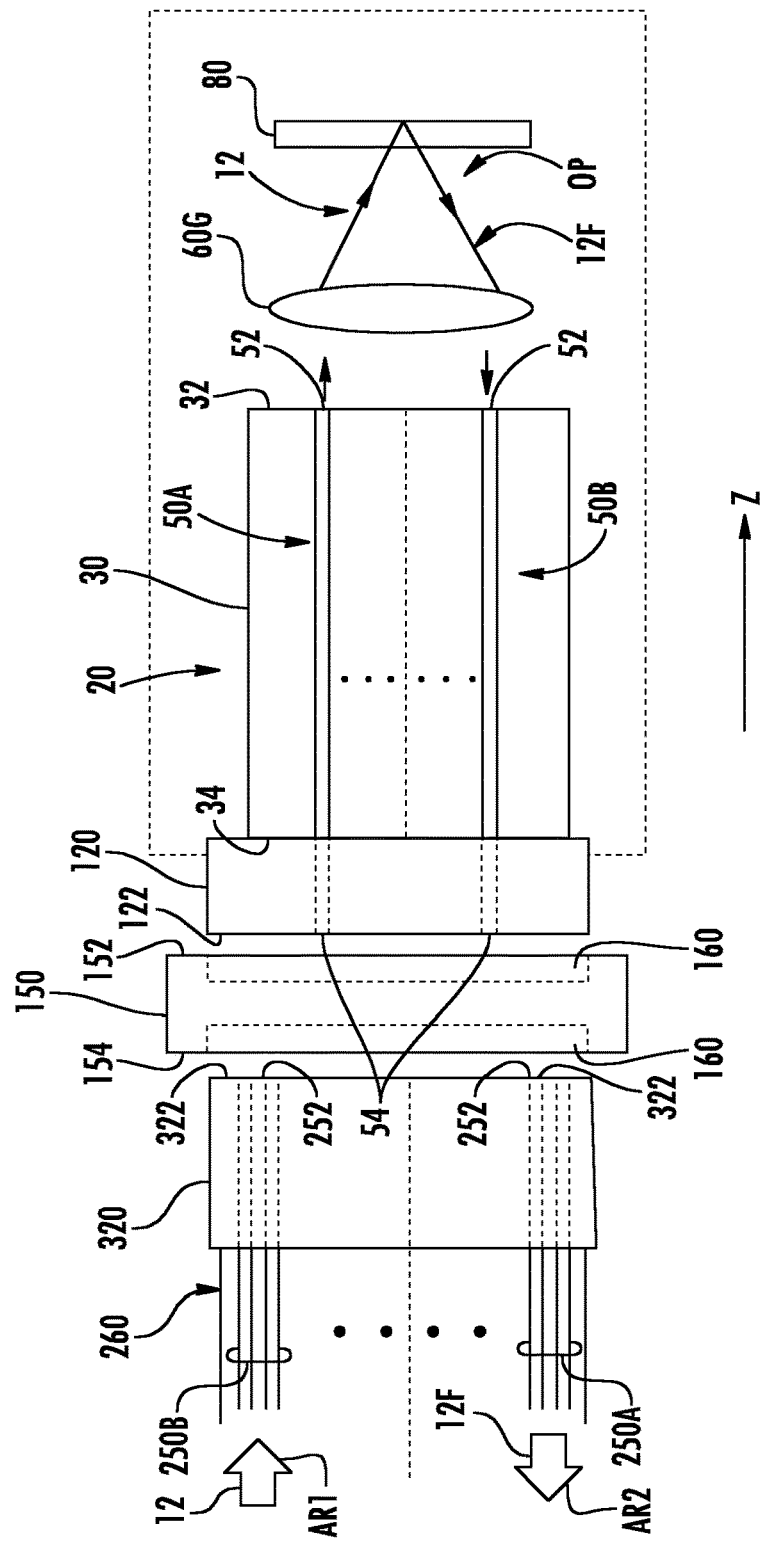
FIG. 4E is a schematic diagram of an example loopback apparatus similar to that of FIG. 4D but wherein the GRIN lens is replaced by a conventional lens.

FIG. 4E is similar to FIG. 4D but replaces the GRIN lens 60G with the conventional lens 60C.

The operation of the loopback apparatus 100 of FIGS. 4D and 4E in the optical fiber system 500 (see FIG. 1F) is similar to that as described above, but with optical signals 12 traveling over the multiple transmit optical fibers 250B and returning as filtered optical signals over the multiple receive optical fibers 250B.

It is noted that the embodiments that utilize multiple input optical fibers 50A and multiple output optical fibers 50B can employ multiple connectors 120 rather than a single connector 120 and also multiple cable connectors 320 rather than a single cable connector 320.

Design Considerations and Advantages

The loopback apparatus 100 disclosed herein provides a number of advantages over conventional loopback apparatus that rely on attenuation optical fibers.

A first advantage is that the TFF 80 can be configured to provide essentially arbitrary amounts of attenuation of the optical signals 12.

A second advantage is that TFF technology is well understood and TFFs are relatively inexpensive as compared to attenuation optical fibers.

A third advantage is that the TFF 80 avoids the need to use different lengths of attenuation optical fibers and so can be made compact. In an example, the housing 400 of the loopback apparatus can be only a few millimeters in diameter and on the order of tens of millimeters in length. Likewise, the components of the optical system 10 can comprise micro-optical components, e.g., having a diameter of just a few millimeters. In an example, the housing 400 can be in the form of a tube, which can be made of a metal (e.g., stainless steel) or a durable plastic.

A fourth advantage is that unlike attenuation optical fibers, the TFF 80 does not introduce mode distortion in the optical signals.

A fifth advantage is that the TFF can be used to perform either power filtering or spectral filtering so that the TFF 80 broadens the signal management applications provided by the loopback apparatus.

A sixth advantage is that the loopback apparatus can be configured to operate either in a reflection mode or transmission mode, with each configuration configured so that the multiple optical paths through the loopback apparatus are symmetric and therefore do not introduce variations in the transmission of the optical signals over the different optical paths.

A seventh advantage is that the loopback apparatus is pluggable, meaning that it can be plugged into and unplugged from the cable 260 of the fiber optical system 500 whose performance is being measured. This pluggable feature can be enabled by connectorizing the input and output optical fibers 50A and 50B and using a suitably configured adapter 150. In an example, the connectorization can be done for individual input and output optical fibers 50A and 50B, or separate for the input optical fibers 50A and the output optical fibers 50B (e.g., using two MPO connectors), or by using a single MPO connector.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A loopback apparatus for use with a fiber optical system, comprising:
   at least one input optical fiber having input and output ends;
   at least one output optical fiber having input and output ends;
   an optical system that defines an optical path and that is configured to optically couple the output end of the at least one input optical fiber with the input end of the at least one output optical fiber over the optical path;
   a thin-film filter (TFF) disposed in the optical path and configured to provide a select amount of optical attenuation of at least 1 dB for light traveling over the optical path; and
   an adapter having a first end and a second end, the first end attached to the input end of the at least one input optical fiber and the output end of the at least one output optical fiber, the second end configured to receive at least one transmit optical fiber and at least one receive optical fiber to place the at least one transmit optical fiber in optical communication with the at least one input optical fiber and to place the at least one receive optical fiber in optical communication with the at least one output optical fiber such that an optical signal from the at least one transmit optical fiber is attenuated by the TFF and propagated to the at least one receive optical fiber.

2. The loopback apparatus according to claim 1, wherein the optical system comprises first and second optical fiber collimators each having front ends, with the first and second optical fiber collimators disposed along an optical axis with their respective front ends confronting, and wherein the TFF is disposed between the confronting front ends.

3. The loopback apparatus according to claim 1, wherein the optical system consists of a single optical fiber collimator and wherein the TFF is reflective.

4. The loopback apparatus according to claim 1, wherein the at least one input optical fiber comprises multiple input optical fibers and wherein the at least one output optical fiber comprises multiple output optical fibers, the multiple output optical fibers being a same number as the multiple input optical fibers.

5. The loopback apparatus according to claim 1, wherein the TFF comprises a tap filter.

6. The loopback apparatus according to claim 1, wherein the optical system comprises at least one collimator that includes a gradient-index (GRIN) lens having an end face, and wherein the TFF is formed on the end face.

7. The loopback apparatus according to claim 6, wherein the at least one input optical fiber and the at least one output optical fiber each include respective front-end sections supported by an optical fiber support member that resides in contact with or proximate to the GRIN lens on a side opposite the end face of the GRIN lens.

8. The loopback apparatus according to claim 1, wherein the input end of the at least one input optical fiber and the output end of the at least one output optical fiber are connectorized using at least one first connector.

9. The loopback apparatus according to claim 8,
   wherein the fiber optical system includes an optical fiber cable that includes the at least one transmit optical fiber and the at least one receive optical fiber, wherein the at least one transmit optical fiber and the at least one receive optical fiber are terminated by at least one second connector; and
   wherein the adapter further comprises a first and second receptacle configured to receive the at least one first connector at the first end and a third and fourth receptacle configured to receive the at least one second connector at the second end to place the at least one transmit optical fiber in optical communication with the at least one input optical fiber and to place the at least one receive optical fiber in optical communication with the at least one output optical fiber.

10. A fiber optical system, comprising:
    optical equipment having a transmitter and a receiver;
    an optical fiber cable that includes at least one transmit optical fiber optically coupled to the transmitter and at least one receive optical fiber optically coupled to the receiver;

a loopback apparatus comprising:
  at least one input optical fiber optically coupled to the at least one transmit optical fiber;
  at least one output optical fiber optically coupled to the at least one receive optical fiber;
  an optical system configured to optically couple the at least one input optical fiber to the at least one output optical fiber over an optical path;
  a thin-film filter (TFF) operably disposed in the optical path and configured to provide a select amount of optical attenuation of at least 1 dB; and
  adapter having a first end and a second end, the first end attached to an input end of the at least one input optical fiber and an output end of the at least one output optical fiber, the second end attached to the at least one transmit optical fiber and the at least one receive optical fiber, the at least one transmit optical fiber in optical communication with the at least one input optical fiber, and the at least one receive optical fiber in optical communication with the at least one output optical fiber such that an optical signal from the at least one transmit optical fiber is attenuated by the TFF and propagated to the at least one receive optical fiber.

11. The fiber optical system according to claim 10, wherein the optical system comprises first and second optical fiber collimators each having front ends, with the first and second optical fiber collimators disposed along an optical axis with their respective front ends confronting, and wherein the TFF is disposed between the confronting front ends.

12. The fiber optical system according to claim 10, wherein the optical system consists of a single optical fiber collimator and wherein the TFF is reflective.

13. The fiber optical system according to claim 10, wherein the at least one input optical fiber comprises multiple input optical fibers and wherein the at least one output optical fiber comprises multiple output optical fibers, the multiple output optical fibers being a same number as the multiple input optical fibers.

14. The fiber optical system according to claim 10, wherein the optical system comprises at least one collimator that includes a gradient-index (GRIN) lens having an end face, and wherein the TFF is formed on the end face.

15. The fiber optical system according to claim 14, wherein the at least one input optical fiber and the at least one output optical fiber each include respective front-end sections supported by an optical fiber support member that resides in contact with or proximate to the GRIN lens on a side opposite the end face of the GRIN lens.

16. The fiber optical system according to claim 10, wherein the input end of the at least one input optical fiber and the output end of the at least one output optical fiber are connectorized using at least one first connector.

17. A method of evaluating a performance of a fiber optical system that includes optical equipment and an optical fiber cable that supports at least one transmit optical fiber and at least one receive optical fiber, comprising:
  transmitting, from a transmitter in the optical equipment, optical signals over the at least one transmit optical fiber to an input end of at least one input optical fiber of a loopback apparatus attached to a first end of an adapter of the loopback apparatus, the at least one transmit optical fiber attached to a second end of the adapter;
  sending the optical signals from the at least one input optical fiber to at least one output optical fiber of the loopback apparatus over an optical path, including directing the optical signals to a thin-film filter (TFF) that resides in the optical path and that is configured to perform filtering of the optical signals to form filtered optical signals with optical attenuation of at least 1 dB;
  directing the filtered optical signals from an output end of the at least one output optical fiber attached to the first end of the adapter to the at least one receive optical fiber of the optical fiber cable attached to the second end of the adapter and then to at least one receiver in the optical equipment; and
  converting the filtered optical signals received by the at least one receiver to electrical signals and then processing the electrical signals.

18. The method according to claim 17, wherein the optical path is defined by an optical system that comprises at least one optical collimator.

19. The method according to claim 18, wherein the at least one optical collimator comprises confronting input and output collimators, and wherein the TFF resides between the confronting input and output collimators, and wherein the optical signals are transmitted through the TFF.

20. The method according to claim 18, wherein the at least one optical collimator comprises a single optical collimator having an end face, and wherein the TFF is operably disposed in contact with or proximate to the end face, and wherein the TFF is reflective so that the optical signals reflect from the TFF.

21. The method according to claim 17, wherein the filtering of the optical signals comprises power filtering of the optical signals.

22. The method according to claim 17, wherein the filtering of the optical signals comprises spectral filtering of the optical signals.

23. The loopback apparatus according to claim 1, wherein the at least one output optical fiber includes a U-shaped bend.

* * * * *